United States Patent [19]
Kinoshita

[11] Patent Number: 5,887,182
[45] Date of Patent: Mar. 23, 1999

[54] MULTIPROCESSOR SYSTEM WITH VECTOR PIPELINES

[75] Inventor: Koji Kinoshita, Tokyo, Japan

[73] Assignee: NEC Corporation, Tokyo, Japan

[21] Appl. No.: 64,678

[22] Filed: May 21, 1993

Related U.S. Application Data

[63] Continuation of Ser. No. 537,303, Jun. 13, 1990, abandoned.

[30] Foreign Application Priority Data

Jun. 13, 1989 [JP] Japan ..................................... 1-148273

[51] Int. Cl.⁶ ...................................................... G06F 15/16
[52] U.S. Cl. ...................................................... 395/800.02
[58] Field of Search ............................... 395/800, 800.02; 364/736

[56] References Cited

U.S. PATENT DOCUMENTS

| | | | |
|---|---|---|---|
| 4,636,942 | 1/1987 | Chen et al. | 395/800 |
| 4,685,076 | 8/1987 | Yoshida | 364/736 |
| 4,849,882 | 7/1989 | Aoyama et al. | 364/736 |
| 4,901,230 | 2/1990 | Chen et al. | 395/800 |
| 4,949,292 | 8/1990 | Hoshino et al. | 364/736 |
| 5,109,499 | 4/1992 | Inagami et al. | 395/425 |
| 5,115,393 | 5/1992 | Kashiyama et al. | 395/425 |

*Primary Examiner*—Kevin J. Teska
*Assistant Examiner*—Ayni Mohamed
*Attorney, Agent, or Firm*—Foley & Lardner

[57] ABSTRACT

In a multiprocessor system having a plurality of processors and main memory common to the processors, each processor includes at least one vector calculation unit which is specific to a vector calculation and which is independent of the vector calculation units in the other processors. A register holds a configuration signal representative of configuration of the vector calculation units in each processor. An access control unit controls access operations of the processors on the basis of the configuration signals in the processors to make the processors selectively access the main memory. Thus, the processors individually carry out the vector calculations to individually access the main memory.

12 Claims, 4 Drawing Sheets

MULTIPROCESSOR SYSTEM WITH VECTOR PIPELINES

This application is a continuation of application Ser. No. 07/537,303, filed Jun. 13, 1990, now abandoned.

BACKGROUND OF THE INVENTION

This invention relates to a multiprocessor system which is capable of processing information at a high speed.

Since a super computer system has been manufactured by Cray Research Inc., Minn., U.S.A. and sold in the name of Cray-1 from 1978. Strong demand has occurred for the ability to carry out a scientific calculation at a high speed.

Under the circumstances, a recent requirement is directed to a computer system which can process not only a great number of vector elements at a high speed but also a great deal of jobs.

In order to satisfy such a requirement, a proposal has been offered about a computer system which comprises a plurality of vector calculation units specific to a vector calculation and an instruction control unit for controlling the vector calculation units. The computer system can certainly execute the vector calculation at a high speed by using the plurality of the vector calculation units and is very effective in processing a great deal of the vector elements at a high speed. However, the computer system mentioned above is not always suitable for processing a great deal of jobs because such jobs are not restricted to the vector calculation alone and any other processing can not be executed during the vector calculation.

On the other hand, a wide variety of computer systems have been proposed each of which comprises a plurality of processors and which may be collectively called multiprocessor systems. Such multiprocessor systems can quickly process a great deal of jobs and can therefore improve throughput. Herein, it is usual that each processor in such a multiprocessor system is similar in structure and operation to one another and comprises a single vector calculation unit in addition to a processing unit for a scalar calculation and an address calculation. This shows that each processor itself can not process a great number of vector elements at a high speed and consequently inevitably takes a long time for the vector calculation. Therefore, each processor is not suitable for carrying out the vector calculation of a great number of vector elements. This means that the conventional multiprocessor systems can not flexibly assign the jobs to the plurality of the processors.

At any rate, none of conventional systems as mentioned above completely satisfy the recent requirement because both a great number of vector elements and a great deal of jobs can not be flexibly processed in the conventional systems.

SUMMARY OF THE INVENTION

It is an object of this invention to provide a multiprocessor system which is capable of processing both a great number of vector elements and a great deal of jobs at a very high speed.

It is another object of this invention to provide a multiprocessor system of the type described, which is capable of flexibly assigning jobs to the processors.

A multiprocessor system to which this invention is applicable comprises a plurality of processors and a main memory common to the plurality of the processors. Each of the processors comprises at least one vector calculation unit specific to a vector calculation and comprises access control means coupled to the vector calculation units in the processors, respectively, and the main memory for individually controlling the vector calculation units in the processors to independently make the vector calculation units access the main memory.

DESCRIPTION OF THE PREFERRED EMBODIMENT

Figure 1:
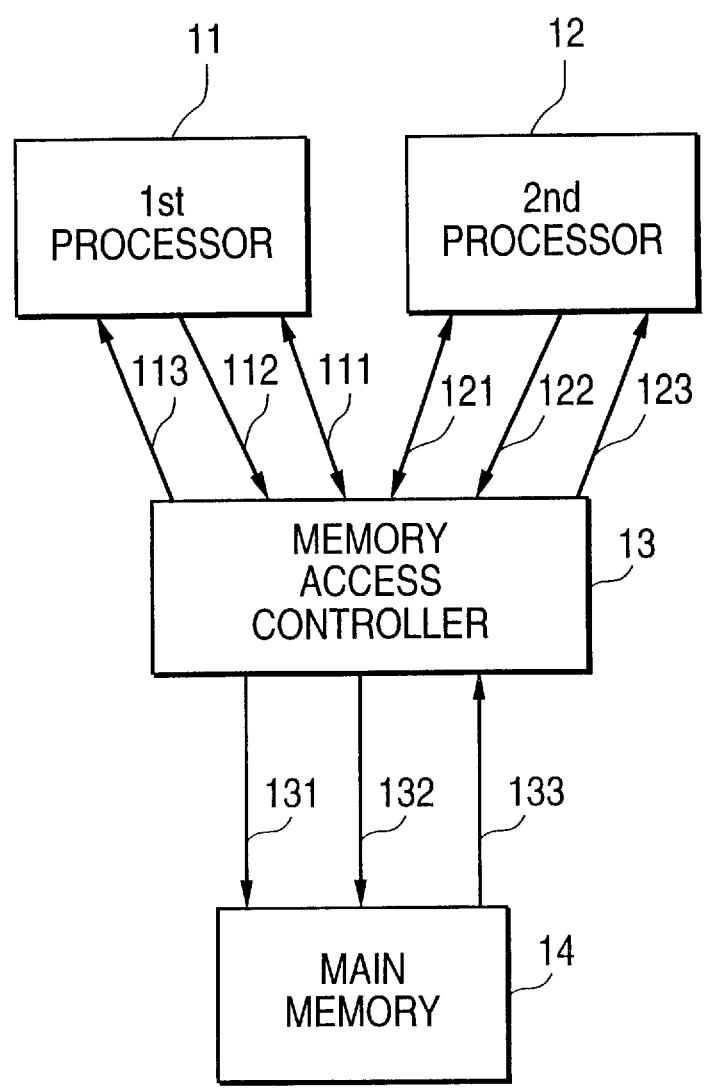
FIG. 1 is a block diagram of a multiprocessor computer system according to a preferred embodiment of this invention.

Referring to FIG. 1, a multiprocessor system according to a preferred embodiment of this invention comprises a couple of processors 11 and 12 which may be called first and second processors, respectively, a memory access controller 13 common to the first and the second processors 11 and 12, and a main memory 14 connected to the memory access controller 13. It is to be noted that the first and the second processors 11 and 12 may not always be identical with each other, although description will be made on the assumption that the first and the second processors 11 and 12 are identical with each other.

In FIG. 1, the first processor 11 is connected to the memory access controller 13 through a first request path 111, a first storage data path 112, and a first load data path 113. Likewise, the second processor 12 is connected to the memory access controller 13 through a second request path 121, a second storage data path 122, and a second load data path 123.

The first and the second request paths 111 and 121 are for transmitting request information signals from the first and the second processors 11 and 12 to the memory access controller 13 or from the memory access controller 13 to the first and the second processors 11 and 12. The first and the second storage paths 112 and 122 are used to transfer storage data signals from the first and the second processors 11 and 12 to the memory access controller 13, respectively. In addition, the first and the second load data paths 113 and 123 are used to transfer load or readout data signals from the memory access controller 13 to the first and the second processors 11 and 12, respectively.

On the other hand, the memory access controller 13 is connected to the main memory 14 through a controller request path 131, a controller storage data path 132, and a controller load data path 133. The controller request path 131 serves to transfer a request information signal between the memory access controller 13 and the main memory 14 while the controller storage data path 132 and the controller load data path 133 serve to transfer the storage data signals from the memory access controller 13 to the main memory 14 and to transfer the load data signals from the main memory 14 to the memory access controller 13, respectively.

Figure 2:
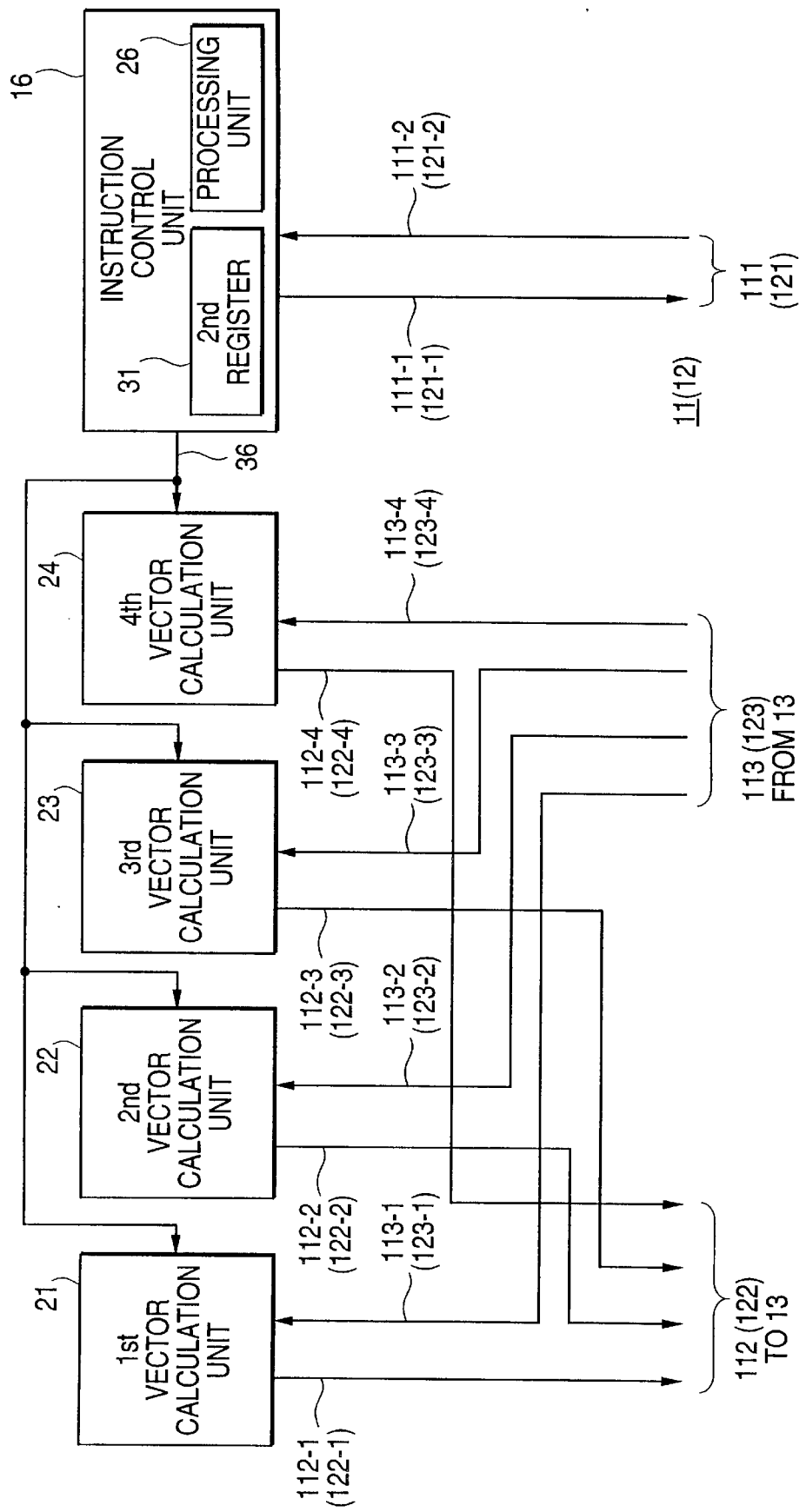
FIG. 2 is a block diagram of a processor for use in the multiprocessor computer system illustrated in FIG. 1.

Referring to FIG. 2 together with FIG. 1, a processor illustrated in FIG. 2 may be either the first processor 11 or the second processor 12 and is assumed to be at first used as the first processor 11. In the example being illustrated, the processor comprises an instruction control unit 16 and four vector calculation units 21, 22, 23, and 24 which will be referred to as first, second, third, and fourth vector calculation units, respectively, and which are specific to the vector calculations. In addition, the illustrated instruction control unit 16 comprises a processing unit 26 which carries out a scalar calculation and calculations other than the vector calculations. The other calculations may be, for example, an address calculation.

The first through fourth vector calculation units 21 to 24 are connected to the memory access controller 13 through first to fourth storage lines 112-1 to 112-4 and through first to fourth load lines 113-1 to 113-4. The first through the fourth storage lines 112-1 to 112-4 collectively form the first storage path 112 while the first through the fourth load lines 113-1 to 113-4 collectively form the first load path 113. On the other hand, the first instruction control unit 16 is connected to the memory access controller 13 through a request transmission line 111-1 and a request reception line 111-2 both of which may be collectively called the first request path 111.

In the illustrated example, the second processor 12 is assumed to be identical with the first processor 11, as mentioned before. When the illustrated processor is used as the second processor 12, the first through the fourth storage line of the second storage data path 122 may be reread as 122-1, 122-2, 122-3, and 122-4 of the second storage data path 122, respectively, as shown in parentheses. Likewise, the first through the fourth load lines of the second load data path 123 reread as 123-1, 123-2, 123-3, and 123-4, respectively, while the request transmission line and the request reception line of the second request path 121 are depicted at 121-1 and 121-2, respectively.

In addition, each instruction control unit 16 of the first and the second processors 11 and 12 comprises a register 31 for monitoring states of the vector calculation units 21 to 24 in each of the first and the second processors 11 and 12, respectively. More specifically, the register 31 is set through a scan path line (not shown) which is used, for example, on diagnosing a fault. In this connection, contents of the register 31 are representative of the number of the vector calculation units available in each of the first and the second processors 11 and 12. In other words, the contents of the register 31 are representative of the configuration of the available vector calculation units and are produced as a configuration signal. Therefore, the register 31 has four bits arranged from a most significant bit to a least significant bit corresponding to the first through the fourth vector calculation units 21 to 24, respectively. For example, when the first through the fourth vector calculation units 21 to 24 are available, the register 31 is set into "1111" where a logic "1" level and a logic "0" level represent an available state of each vector calculation unit and an unavailable state, respectively. If the first vector calculation unit 21 alone is available while the other vector calculation units 22 to 24 are unavailable due to occurrence of faults or the like, the first register 31 is set into "1000". Thus, the contents of the first register 31 take a state selected from seven states of "1000", "1100", "0011", "1000", "0100", "0010", and "0001".

In FIG. 2, the first through the fourth vector calculation units 21 to 24 are operable in parallel to one another by forming pipelines for the vector calculations. For this purpose, each of the first through the fourth vector calculation units 21 to 24 comprises a group of vector registers for holding a plurality of vector elements and a set of pipelines for calculating addition, subtraction, multiplication, division, logic operation, and shift operation, as known in the art. Vector elements are successively assigned or allocated to each of the first through the fourth vector calculation units 21 to 24 that is put into an available state in a predetermined order, for example, an ascending order. Such allocation of the vector elements to the first through the fourth vector calculation units 21 to 24 is carried out by dividing numbers assigned to the respective vector elements by the number of the vector calculation units 21 to 24 to obtain residues and by successively assigning the vector elements specified by the residues to the vector calculation units 21 to 24.

Let the processor illustrated in FIG. 2 be used as the first processor 11. The storage data signals are sent from the first through the fourth vector calculation units 21 to 24 to the memory access controller 13 through the first to the fourth storage lines 112-1 to 112-4 while the load data signals are sent from the memory access controller 13 to the first through the fourth vector calculation units 21 to 24 through the first to the fourth load lines 113-1 to 113-4, respectively. In addition, the instruction control unit 16 is operable to control decoding and production of each instruction.

Decoding a vector calculation instruction, the first instruction control unit 16 (FIG. 2) delivers a vector calculation instruction to the first through the fourth vector calculation units 21 to 24 through a first internal instruction line 36. In this event, the first instruction control unit 16 supplies the memory access controller 13 through the request transmission line 111-1 with the request information signal which includes various kinds of information to be described in detail later. Similar operation is carried out in the second processor 12. In this case, the request information signal is delivered to the memory access controller 13 through the request transmission line 121-1 (shown in parentheses in FIG. 2).

When a sequence of vector elements is read out of the main memory 14 as the load or readout data signals after completion of a memory access operation, a reply signal is sent from the memory access controller 13 to the instruction control unit 16 through the request reception line 111-2 or 121-2. When the reply signal is assumed to be supplied to the first processor 11, the instruction control unit 16 delivers a data fetch instruction to the first through the fourth vector calculation units 21 to 24 of the first processor through the first internal instruction line 36. As a result, the vector elements are successively assigned to and fetched as the load data signals into the first through the fourth vector calculation units 21 to 24 in accordance with the contents of the register 31 in the manner mentioned before. Thereafter, the first through the fourth vector calculation units 21 to 24 are processed in parallel to one another in a pipeline fashion. It is to be noted that the vector elements are assigned only to the vector calculation units which are available.

Similar operation is carried out in the second processor 12 when the vector elements are read out of the main memory 14 to be sent through the memory access controller 13 to the second processor 12.

On the other hand, the scalar calculation and the address calculation are executed in the processing unit 26 of each of the first and the second processors 11 and 12.

With this structure, the vector elements are mainly assigned under control of the memory access controller 13 to the first processor 11 or the second processor 12 in consideration of the contents of the register 31 and processed by a selected one of the first and the second processors 11 and 12 that comprises a plurality of the vector calculation units 21 to 24. Therefore, the vector elements can be processed at a high speed. Moreover, the scalar calculation can be processed by the remaining processor 12 while the selected processor processes the vector elements and may be executed independently of the selected processor. Accordingly, a lot of jobs can be flexibly assigned to the processors and be also processed at a high speed in the illustrated multiprocessor system.

Figure 3:
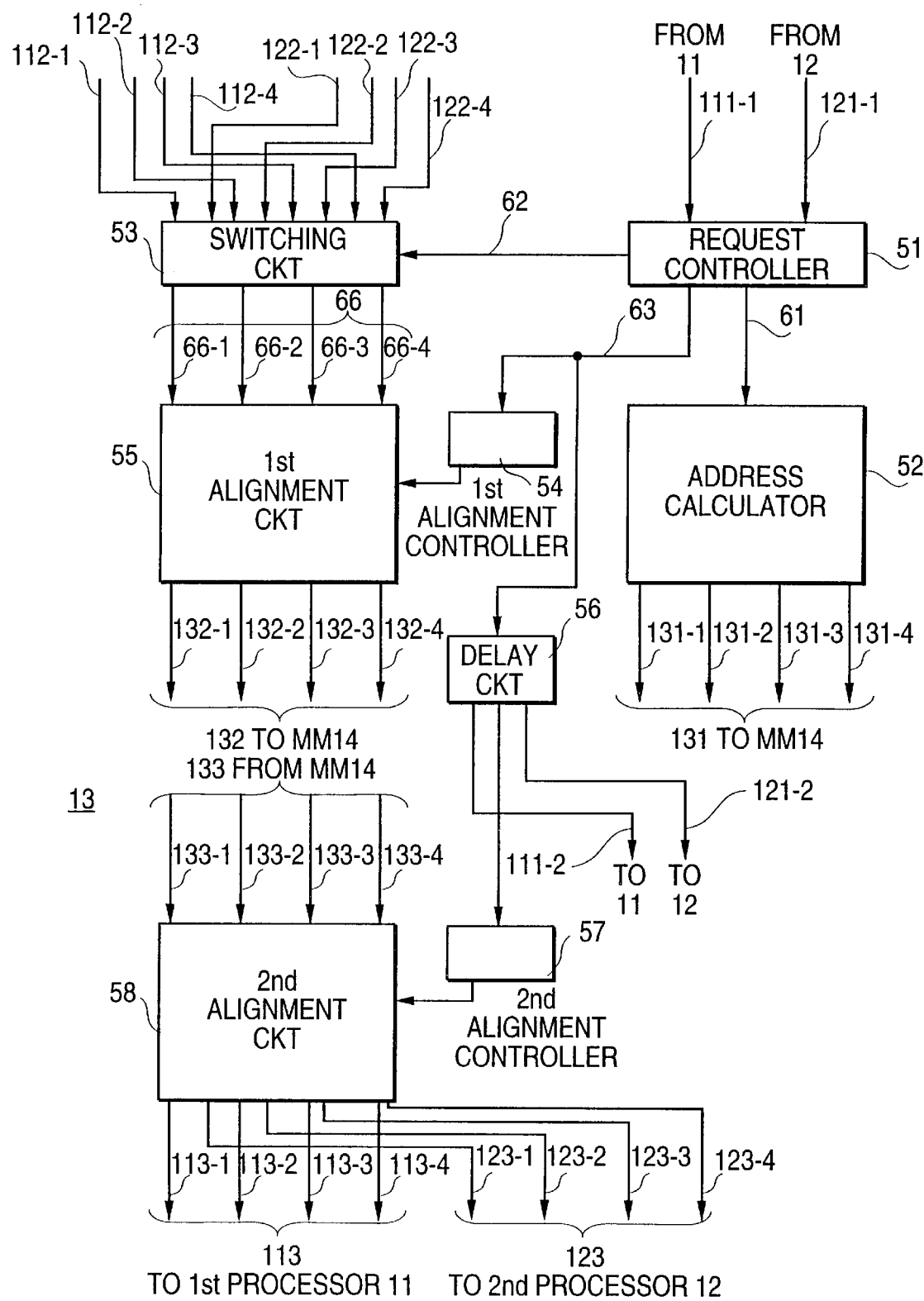
FIG. 3 is a block diagram of a memory access controller for use in the multiprocessor system illustrated in FIG. 1.

Referring to FIG. 3, the memory access controller 13 comprises a request controller 51, an address generator 52, a switching circuit 53, a first alignment controller 54, a first alignment circuit 55, a delay circuit 56, a second alignment controller 57, and a second alignment circuit 58. The request controller 51 is connected to the request transmission lines 111-1 and 121-1 jointed to the instruction control units 16 of the first and the second processors 11 and 12 and controls the address generator 52, the switching circuit 53, and the first alignment controller 54 through first, second, and third internal connections 61, 62, and 63, respectively. The request controller 51 also controls the delay circuit 56 through the third internal connection 63. At any rate, the request controller 51 serves to arbitrate the request information signals sent from the first and the second processors 11 and 12 in a manner to be described later and may be called an arbitrating circuit.

The switching circuit 53 is connected to the first through the fourth storage lines 112-1 to 112-4 (FIG. 2) of the first storage data path 112 extended from the first through the fourth vector calculation units 21 to 24 and is connected to the first through the fourth storage lines 122-1 to 122-4 of the second storage data path 122. The switching circuit 53 is operable to switch the first storage data path 112 and the second storage data path 122 from one to another under control of the request controller 51. Consequently, the storage data signals on the first storage data path liens 112 and the second storage data path 122 are selectively produced from the switching circuit 53.

The storage data signals selected by the switching circuit 53 are sent to the first alignment circuit 55 through first through fourth inner lines 66-1 to 66-4 which are collectively depicted at 66 and are delivered to the first alignment circuit 55 controlled by the first alignment controller 54 connected to the request controller 51 through the third internal connection 63. The first alignment circuit 55 assigns the storage data signals to the controller storage path 132 under control of the first alignment controller 54. The illustrated controller storage path 132 is formed by first through fourth controller storage lines 132-1 to 132-4 which are connected to memory ports of the main memory 14.

The address calculator 52 is connected to the request controller 51 through the first internal connection 61 and can simultaneously produce four address signals at maximum. The address signals are sent to the main memory 14 through the controller request path 131 which is composed of through fourth controller request lines 131-1 to 131-4. The request controller 51 also controls the second alignment controller 57 through the delay circuit 56 connected to the first and the second processors 11 and 12 through the request reception lines 111-2 and 121-2, respectively.

The second alignment circuit 58 is connected to the main memory 14 through the controller load data path 133 composed of first through fourth controller load lines 133-1 to 133-4 and is connected to the first load data path 113 and the second load data path 123 extended from the first and the second processors 11 and 12. The second alignment circuit 58 serves to selectively deliver the load data signals to the first and the second processors 11 and 12 through the first and the second load data paths 113 and 123 under control of the second alignment controller 57.

As readily understood from the above, a combination of the switching circuit 53 and the first and the second alignment circuits 55 and 58 serves to connect the vector calculation units to the main memory 14.

In operation, let the first processor 11 supply the request information signal from the instruction controller 16 (FIG. 2) to the memory access controller 13 through the request transmission line 111-1. In this event, it is surmised that the request information signal includes a request, a leading address of the vector elements, the distance between two adjacent vector elements, the number of the vector elements, a command representative of a species of access operations, and the contents of the first register 31 which are held in the instruction control unit 16 and which are representative of the number of the vector calculation units which are available in the first processor 11 and which may be called available vector calculation units.

The request controller 51 arbitrates the requests between the first and the second processors 11 and 12 to select either one of the requests as a selected request. Thereafter, the request controller 51 determines a maximum number of vector elements which are simultaneously accessible by the selected request and which may be called simultaneously accessible vector calculation units. In this event, the maximum number of the vector elements is decided by the number of the available vector calculation units. Specifically, when the available vector calculation units are equal in number to four, the maximum number of the simultaneously accessible vector elements is equal to four. Likewise, when the number of the available vector calculation units is equal to two and unity, the maximum numbers of the simultaneously accessible vector elements are equal to two and one, respectively.

Inasmuch as the request information signals are individually sent from the respective processors, the request controller 51 correctly calculates the number of the simultaneously accessible vector elements at every request even when the numbers of the vector calculation units in the processors are different from one another.

The request controller 51 supplies the address calculator 52 through the first internal connection 61 with the number of the simultaneously accessible vector elements together with the leading address and the distance between two adjacent vector elements. The address calculator 52 calculates addresses of the vector elements on the basis of the leading address, the number of the simultaneously accessible vector elements, and the distance. The addresses calculated by the address calculator 52 are equal in number of the number of the simultaneously accessible vector elements and are sent to the main memory 14 through the controller request lines 131-1 to 131-4 along with the request.

Figure 4:
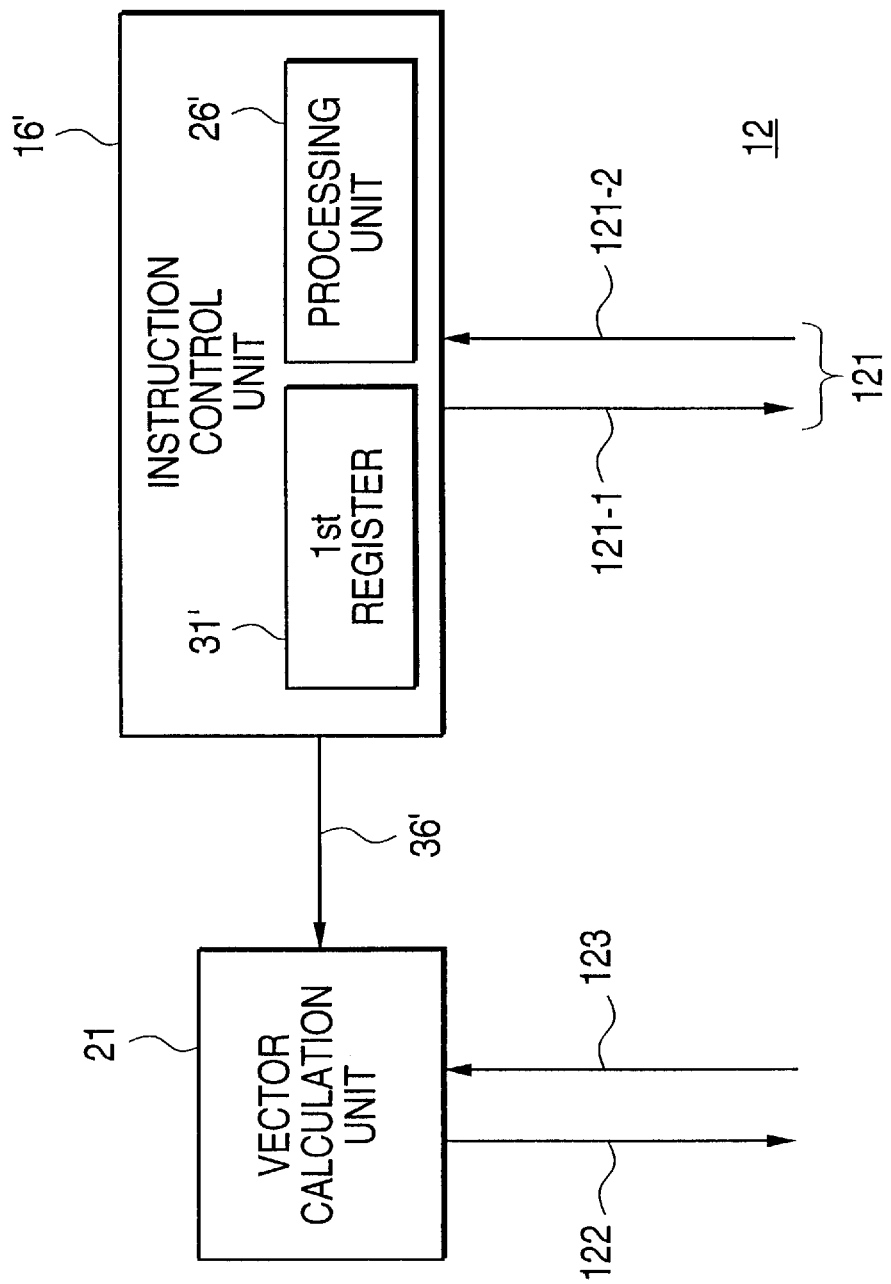
FIG. 4 is a block diagram of another processor applicable to the multiprocessor system illustrated in FIG. 1.

Herein, the request is assumed to be a storage request which requests to store data signals from the first processor 11 to the main memory 14. In addition, it is assumed that first through fourth ones of the storage data signals are sent from the first through the fourth vector calculation units 21 to 24 (FIG. 2) to the switching circuit 53 (FIG. 4). Under the circumstances, the request controller 51 selects the first processor 11 and supplies the switching circuit 53 through the second internal connection 62 with a switching signal indicative of selection of the first through the fourth storage data lines 112-1 to 112-4 of the first processor 11. As a result, the first through the fourth storage data signals are sent from the switching circuit 53 through the four internal lines 66 to the first alignment circuit 55 which is controlled by the first alignment controller 54.

The first alignment controller 54 is supplied from the request controller 51 through the third internal connection 63 with the leading address, the distance between two adjacent vector elements, and the number of the available vector calculation units. In other words, the number of the available vector calculation units may be referred to as a configuration signal representative of configuration of the available vector calculation units. Responsive to the leading address, the distance, and the number of the available vector calculation units, the first alignment controller 54 delivers a control signal to the first alignment circuit 55. The control signal controls the first alignment circuit 55 so that the storage data signals on the first through the fourth inner lines 66-1 to 66-4 are assigned to the first through the fourth controller storage lines 132-1 to 132-4 determined by the leading address, the distance, and the number of the available vector calculation units. Such an alignment controller 54 and a first alignment circuit 55 may be described in the copending U.S. Pat. application Ser. No. 393,843 which is a continuation application of U.S. Pat. application Ser. No. 822,196 filed Jan. 24, 1986, and will therefore not be mentioned any longer.

For example, it is assumed that the contents of the first register 31 are equal to "111" and that the leading address of the leading one of the storage data signals and the following address of the following one of the storage data signals are made to correspond to the memory ports of the main memory 14 connected to the first and the second controller storage lines 132-1 and 132-2, respectively. In this event, when the illustrated memory access controller 13 is accessed by the first processor 11, the leading storage data signal is given through the first inner line 66-1 and is assigned to the first controller storage line 132-1 to be supplied to the main memory 14 while the following storage data signal is given through the second inner lines 66-2 and is assigned to the second controller storage line 132-2 to be delivered to the main memory 14.

On the other hand, when the second processor 12 accesses the main memory 14 with the register 31 kept at "0011", the storage data signals are sent through the switching circuit 53 to the first alignment circuit 55 to be assigned to the third and the fourth controller storage lines 132-3 and 132-4 on the basis of the content of the register 31 (FIG. 2). Thus, the first alignment circuit 55 assigns the storage data signals to the third and the fourth controller storage data lines 132-3 and 132-4 in accordance with the configuration of the available vector calculation units indicated by the register 31.

In the example being illustrated, the request controller 51 is also connected to the delay circuit 56 through the third internal connection 63. This shows that the delay circuit 56 is supplied from the request controller 51 with the request information signal. The request information signal is delayed by the delay circuit 56 for an interval of time necessary for accessing the main memory 14. After lapse of the interval of time, a reply signal is sent back to the first and the second processors 11 and 12 through the request reception lines 111-2 and 121-2, respectively.

When the load or readout request is issued as the request information signal from each processor, the load or the readout data signals are read out of the main memory 14 to be supplied to the second alignment circuit 58 through the controller load data path 133 composed of the first through the fourth controller load lines 113-1 to 113-4. The second alignment circuit 58 assigns the load data signals to the first load data path 113 or the second load data path 123 under control of the second alignment controller 57 connected to the delay circuit 56. In this case, the second alignment controller 57 is similar in structure and operation to the first alignment controller 54 except that the leading address, the distance, and the number of the available vector calculation units are delayed by the delay circuit 56. In addition, the second alignment circuit 58 serves to supply the load data signals to the vector calculation units included in the first and the second processors 11 and 12 under control of the second alignment controller 57 and is operable in a manner similar to the first alignment controller 54. As a result, the second alignment controller 57 controls the second alignment circuit 58 so that the load data signals are correctly assigned or distributed to the first load data path 113 or the second load data path 123. More specifically, the second alignment circuit 58 is controlled so that the leading load data signal read out of the leading address of the main memory 14 is returned back to the vector calculation units determined for the leading load data signal on the basis of the contents of the register 31 of each processor. From this fact, it is readily understood that the load data signals are correctly delivered to the first and the second processors 11 and 12 even when both the first and the second processors 11 and 12 have vector calculation units different in number from each other.

Thus, the multiprocessor system illustrated in FIGS. 1 through 4 comprises a plurality of processors each of which comprises at least one vector calculation unit and a register for storing a configuration signal representative of the configuration of the vector calculation unit or units. In addition, each processor issues a memory access request including the configuration signal. Therefore, it is possible to put the processors into operation even when the configuration of the vector calculation units in each processor is different from one another. Therefore, the multiprocessor system flexibly assigns jobs to the processors. Moreover, a reduction of the performance of the vector calculation units can be minimized in the system. This is because each register 31 of the first and the second processors 11 and 12 individually indicates the configuration of the vector calculation units.

Although the first through the fourth vector calculation units 21 to 24 have been installed in each of the first and the second processors 11 and 12 as illustrated in FIG. 2, the numbers of the vector calculation units may be different from each other in the first and the second processors 11 and 12.

Referring to FIG. 4, the second processor 12 (FIG. 1) comprises a single vector calculation unit 21 which is similar in structure and operation to those illustrated in FIG. 2. In addition, the second processor 12 further comprises an instruction control unit 16' which includes a processing unit 26' which is similar in operation and structure to the processing unit 26 illustrated in FIG. 2. The single vector calculation unit 21 is connected to the memory access controller 13 through the second storage data path 122 and the second load data path 123 like in FIG. 1 while the instruction control unit 16' is connected to the memory access controller 13 through a request transmission line 121-1 and a request reception line 121-2 both of which form the second request path 121.

In the example being illustrated, the register 31 in the second processor 12 may be structured by a single bit register and is set into "1" or "0".

The second processor 12 illustrated in FIG. 4 is operable in a manner similar to that illustrated in FIG. 2 and will not be described any longer.

While this invention has thus far been described in conjunction with a preferred embodiment thereof, it will readily be possible for those skilled in the art to put this invention into practice in various other manners. For example, two or more processors may be included in the multiprocessor system. In this event, each processor may comprise a plurality of vector calculation units which are independently controlled by the memory access controller.

What is claimed is:

1. A multiprocessor system comprising:
   a plurality of processors, each of said processors including a plurality of vector calculation units, each of said vector calculation units executing a vector calculation in a pipeline fashion;
   a main memory common to said plurality of processors; and
   access control means coupled to said vector calculation units in said processors, respectively, and to said main memory for individually controlling said vector calculation units in each of said processors to selectively change the number of active vector calculation units in each of said processors in accordance with a vector calculation to be executed and to independently enable said active vector calculation units to access said main memory and to thereby execute a vector calculation by use of said active vector calculation units in the pipeline fashion.

2. A multiprocessor system as claimed in claim 1, wherein said number of active vector calculation units is different for each processor.

3. A multiprocessor system as claimed in claim 2, wherein register means in each of said processors indicates said number of active vector calculation units available in each of said processors.

4. A multiprocessor system as claimed in claim 1, wherein each of said processors further comprises a processing unit for carrying out a calculation other than a vector calculation.

5. A multiprocessor system comprising:
   a plurality of processors, each of said processors including a plurality of vector calculation units, each of said vector calculation units executing a vector calculation in a pipeline fashion;
   a main memory common to said plurality of processors; and
   access control means coupled to said vector calculation units in said processors, respectively, and to said main memory for individually controlling said vector calculation units in each of said processors to selectively change the number of active vector calculation units in each of said processors in accordance with a vector calculation to be executed and to independently enable said active vector calculation units to access said main memory and to thereby execute a vector calculation by use of said active vector calculation units in the pipeline fashion; wherein
   each of said processors comprises register means for storing a configuration signal representative of a configuration of said plurality of vector calculation units in each of said processors and indicating said number of active vector calculation units; and
   said access control means includes
      arbitrating means coupled to said processors for arbitrating access to said main memory on the basis of said configuration signal output from each of said processors to produce a control signal representative of a processor which is accessible to said main memory, and
      connection means, connected to said vector calculation units of said processors and to said arbitrating means, for selectively connecting to said main memory vector calculation units of said processor represented by said control signal.

6. A multiprocessor system comprising;
   a main memory;
   a plurality of processors, each of said processors comprising
      a plurality of vector calculation units for performing vector calculations according to pipeline operation, and
      a storage unit for storing an active indication signal for indicating currently active vector calculation units among said plurality of vector calculation units; and
   access control means, coupled to said vector calculation units and to said main memory, for providing access to said main memory for said currently active vector calculation units, by changing the number of the currently active vector calculation units in accordance with said active indication signal stored in said storage unit and by executing vector calculations by use of the currently active vector calculation units.

7. The multiprocessor system of claim 6, wherein said access control means further controls the number of said vector calculation units which are said currently active vector calculation units.

8. The multiprocessor system of claim 6, wherein each of said processors further includes an instruction controller for providing vector calculation instructions for controlling said currently active vector calculation units.

9. The multiprocessor system of claim 8, wherein said instruction controller includes said storage unit for storing said active indication signal.

10. The multiprocessor system of claim 9, wherein said storage unit comprises a register.

11. The multiprocessor system of claim 9, wherein said instruction controller further includes scalar processing means for performing scalar calculations while said active vector calculation units perform said vector calculations.

12. The multiprocessor system comprising:
    a main memory;
    a plurality of processors, each of said processors comprising
       a plurality of vector calculation units for performing vector calculations according to pipeline operation, and
       a storage unit for storing an active indication signal for indicating currently active vector calculation units among said plurality of vector calculation units; and
    access control means, coupled to said vector calculation units and to said main memory, for providing access to said main memory for said currently active vector calculation units, by changing the number of the currently active vector calculation units in accordance with said active indication signal stored in said storage unit and by executing vector calculations by sue of the currently active vector calculation units; wherein
    said access control means includes
    arbitrating means coupled to said processors for arbitrating access to said main memory on the basis of said active indication signal from each of said processors to produce a control signal representative of an accessible processor of said processors which is accessible to said main memory, and
    connection means, connected to said vector calculation units of said processors and to said arbitrating means, for selectively connecting said active vector calculation units of said accessible processor represented by said control signal to said main memory.

* * * * *